(12) United States Patent
Mesner

(10) Patent No.: US 8,528,590 B2
(45) Date of Patent: Sep. 10, 2013

(54) COMBINATION SOLENOID CHECK VALVE

(75) Inventor: Steven Mesner, Tomah, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 6 days.

(21) Appl. No.: 13/148,603

(22) PCT Filed: Feb. 9, 2010

(86) PCT No.: PCT/US2010/023534
§ 371 (c)(1),
(2), (4) Date: Aug. 9, 2011

(87) PCT Pub. No.: WO2010/091378
PCT Pub. Date: Aug. 12, 2010

(65) Prior Publication Data
US 2011/0309278 A1     Dec. 22, 2011

Related U.S. Application Data

(60) Provisional application No. 61/150,886, filed on Feb. 9, 2009.

(51) Int. Cl.
*F16K 31/12* (2006.01)

(52) U.S. Cl.
USPC .................. 137/487.5; 251/129.15; 251/30.02

(58) Field of Classification Search
USPC ..... 251/26, 30.01–30.05, 129.15; 137/487.5, 137/490, 491, 492
See application file for complete search history.

(56) References Cited

U.S. PATENT DOCUMENTS

| | | | |
|---|---|---|---|
| 3,010,691 A | 11/1961 | Canfield | 251/30 |
| 4,779,836 A * | 10/1988 | Marklund | 251/26 |
| 5,551,664 A * | 9/1996 | Boke | 251/30.03 |
| 6,328,275 B1 * | 12/2001 | Yang et al. | 251/30.03 |
| 7,621,211 B2 * | 11/2009 | Ma et al. | 91/446 |
| 8,256,739 B2 * | 9/2012 | Pfaff | 251/29 |
| 2007/0290151 A1 * | 12/2007 | Muller | 251/26 |
| 2007/0290153 A1 * | 12/2007 | Ma et al. | 251/34 |
| 2009/0032746 A1 * | 2/2009 | Smith et al. | 251/30.02 |
| 2010/0294380 A1 * | 11/2010 | Nagata et al. | 137/487.5 |

FOREIGN PATENT DOCUMENTS

| | | |
|---|---|---|
| WO | 2007/149197 A1 | 12/2007 |
| WO | 2007/149229 A1 | 12/2007 |

OTHER PUBLICATIONS

International Search Report, International Application PCT/US2010/023534, mailed May 10, 2010.
International Preliminary Report on Patentability, International Application PCT/US2010/023534, mailed Jun. 21, 2011.

* cited by examiner

*Primary Examiner* — John Bastianelli
*Assistant Examiner* — Andrew J Rost
(74) *Attorney, Agent, or Firm* — Renner, Otto, Boisselle & Sklar LLP

(57) ABSTRACT

A valve (10) is provided that combines the features of a solenoid valve and a check valve into a singel combination solenoid check valve. The valve utilizes a first check valve (58) to allow fluid to flow from the outlet passageway (28) of the valve to a chamber (36) above the piston (40) to ensure that the valve remains closed when the outlet pressure in the valve is greater than the inlet pressure. The valve also utilizes a second check valve (42) that closes a bleed aperture through the piston when the pressure in the chamber above the piston is greater than the inlet pressure.

8 Claims, 2 Drawing Sheets

COMBINATION SOLENOID CHECK VALVE

CROSS REFERENCE TO RELATED APPLICATIONS

The present application claims the benefit of the filing date of U.S. Provisional Patent Application Ser. No. 61/150,886, filed Feb. 9, 2009, the disclosure of which is incorporated herein by reference in its entirety.

TECHNICAL FIELD

The present invention relates, in general, to a globe valve (solenoid valve) such as the type used in refrigeration applications, and in particular to a valve that combines a solenoid valve and a check valve into a single valve.

BACKGROUND

In a typical refrigeration system the flow of refrigerant is often controlled through a series of valve groupings. These valve groups (a.k.a. valve trains) consist of individual valves piped together either through bolted flanges, or weld sections of pipe. These valve trains can be made up of any one of a number of different valve types. One such common train consists of a hand valve, solenoid valve, and a check valve coupled together in series. The direction of the refrigerant flow through the valves is the same order as the valves are listed above. The hand valve is used during service situations of the solenoid and check valves. Upon closure of the hand valve all flow of refrigerant is stopped, allowing the solenoid and check valves to be disassembled and serviced. The solenoid valve provides automatic on/off control of the flow of refrigerant during normal operation. The check valve prevents any reverse flow of refrigerant through the solenoid valve.

A prior art solenoid valve 110, model S4W available from Parker Hannifin Corporation, is shown in FIG. 1. In the S4W valve 110, high pressure liquid or gas is stopped at the inlet passageway side 26' of the valve 110 by piston 40'. The design of the main piston plug 40' allows inlet pressure to the internal surfaces of the piston 40' and to the top of the piston thus holding the valve closed tightly. The internal portions of the piston are open directly to the inlet flow while pressure to the top of piston is gained through a small bleed hole in the piston (not shown).

To open the valve 110, a coil (not shown) on the valve is energized opening a passage (formed by the combination of 52'+54'+38') which allows the pressure contained on top of the piston 40 to bleed off to the outlet (low pressure) passageway side 28' of the valve 110. The pressure difference across the piston 40 (low on top/high internally) allows the spring 62' to be overcome and the higher inlet pressure to push the main valve piston open—thus opening the valve and allowing flow underneath piston and through the valve seat 30'. The valve remains in the open position as long as the coil is energized. Once the coil is de-energized the pressure on top of the piston 40 can no longer bleed to the outlet side of the valve. This causes the pressure on top of the piston to equalize with the pressure in the internal portions of the piston. Equalization is accomplished through the small bleed hole in the top of the piston (not shown). Once the pressure has equalized, the main valve spring 62' can now push the piston 40' closed shutting off the valve port 30'. Once again a pressure difference is created between the inlet side 26' of the valve, and the outlet side 28' of the valve, helping to hold it shut tightly.

Pilot operated solenoid valves only work in one direction. Should a higher pressure build on outlet side of the valve than on the inlet side, the main piston will be pushed open allowing backward flow through the valve. Thus the need for a separate check valve, such as the prior art CK-1 check valve 210 available from Parker Hannifin Corporation, as shown in FIG. 2. Note that the body is reversed with respect to the flow direction.

SUMMARY

At least one embodiment of the invention provides a valve assembly comprising: a valve housing including an inlet port having an inlet passageway and an outlet port having an outlet passageway separated by an aperture forming a valve port; a piston moveable to open and close the valve port; a solenoid operable to fluidly connect and disconnect a chamber above the piston to the outlet passageway of the valve housing; a first check valve positioned to allow fluid flow from the outlet passageway of the valve housing to the chamber above the piston while preventing flow in the opposite direction; a second check valve positioned to allow fluid flow from the inlet passageway to the chamber above the piston while preventing flow in the opposite direction.

At least one embodiment of the invention provides a valve assembly comprising: a valve body having spaced inlet and outlet ports separated by an intermediate valve seat in open communication with the inlet and outlet ports; a piston reciprocable within a bore in the valve body, the piston including a valve member being adapted to sealingly mate with the valve seat; an adapter body secured to an open end of the bore in the valve body; a solenoid assembly operable to open a conduit from the bore in the valve body to the valve outlet; a first check valve providing a conduit from the outlet passageway of the valve housing to the bore in the valve body above the piston while preventing flow in the opposite direction; a second check valve providing a conduit from the inlet passageway to the bore in the valve body above the piston while preventing flow in the opposite direction.

At least one embodiment of the invention provides a valve assembly comprising: a valve housing including an inlet port having an inlet passageway and an outlet port having an outlet passageway separated by an aperture forming a valve seat in open communication with the inlet and outlet ports; a piston reciprocal within a bore in the valve body, the piston including a valve member being adapted to sealingly mate with the valve seat, the piston positioned such that the valve opens by moving the valve member of the piston into the inlet passageway and away from the outlet passageway; a biasing member for normally biasing the valve member toward the valve seat; an adapter body secured to an open end of the bore in the valve body; a solenoid assembly operable to open a conduit from the bore in the valve body above the piston to the outlet passageway of the valve; a first check valve positioned in the adapter plate, the first check valve allowing fluid to flow from the outlet passageway of the valve to the bore in the valve body above the piston but preventing fluid flow through the check valve from the valve body above the piston to the outlet passageway of the valve; a second check valve positioned in a portion of the piston, the second check valve allowing fluid flow from the inlet passageway of the valve to the chamber above the piston but preventing fluid flow from the chamber above the piston to the inlet passageway of the valve.

BRIEF DESCRIPTION OF THE DRAWINGS

Embodiments of this invention will now be described in further detail with reference to the accompanying drawings, in which.

DETAILED DESCRIPTION

Figure 1:
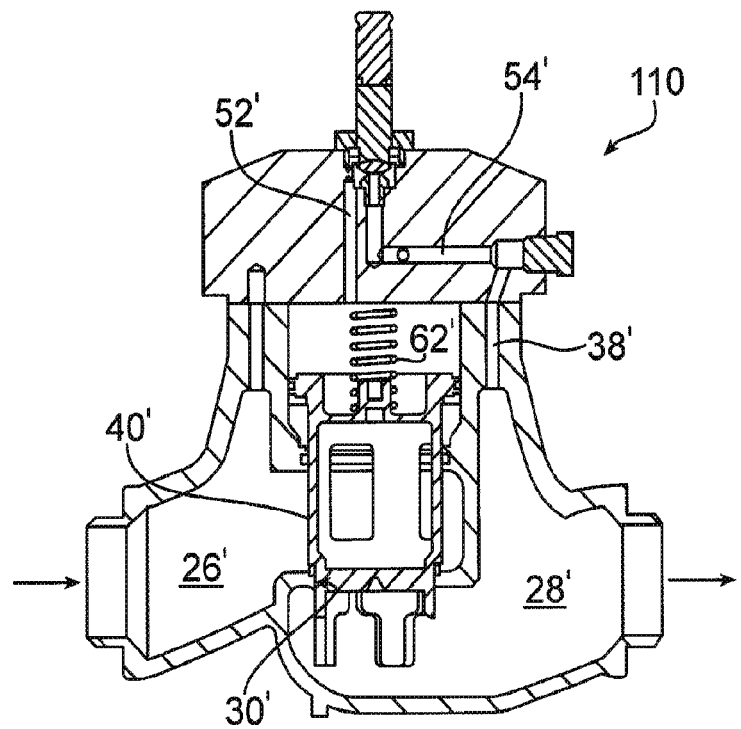
FIG. 1 is a cross-sectional view of a prior art solenoid valve.
Figure 2:
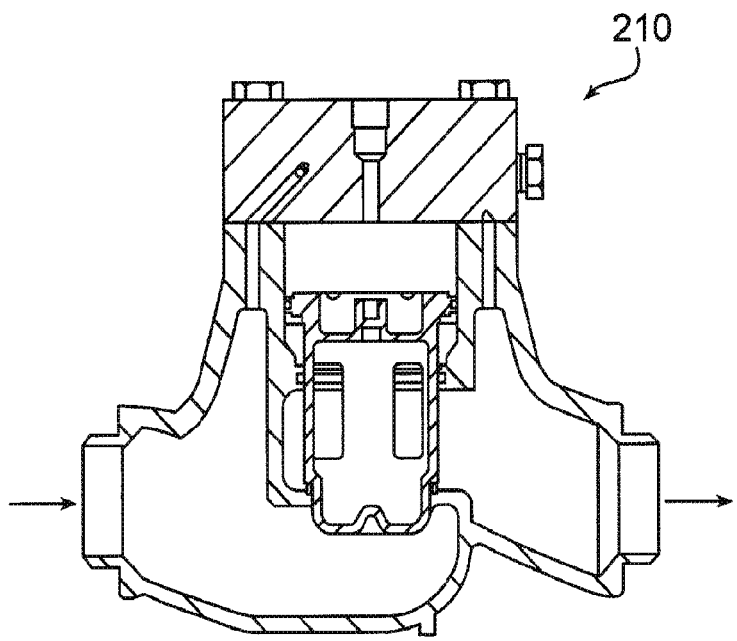
FIG. 2 is a cross-sectional view of a prior art check valve.
Figure 3:
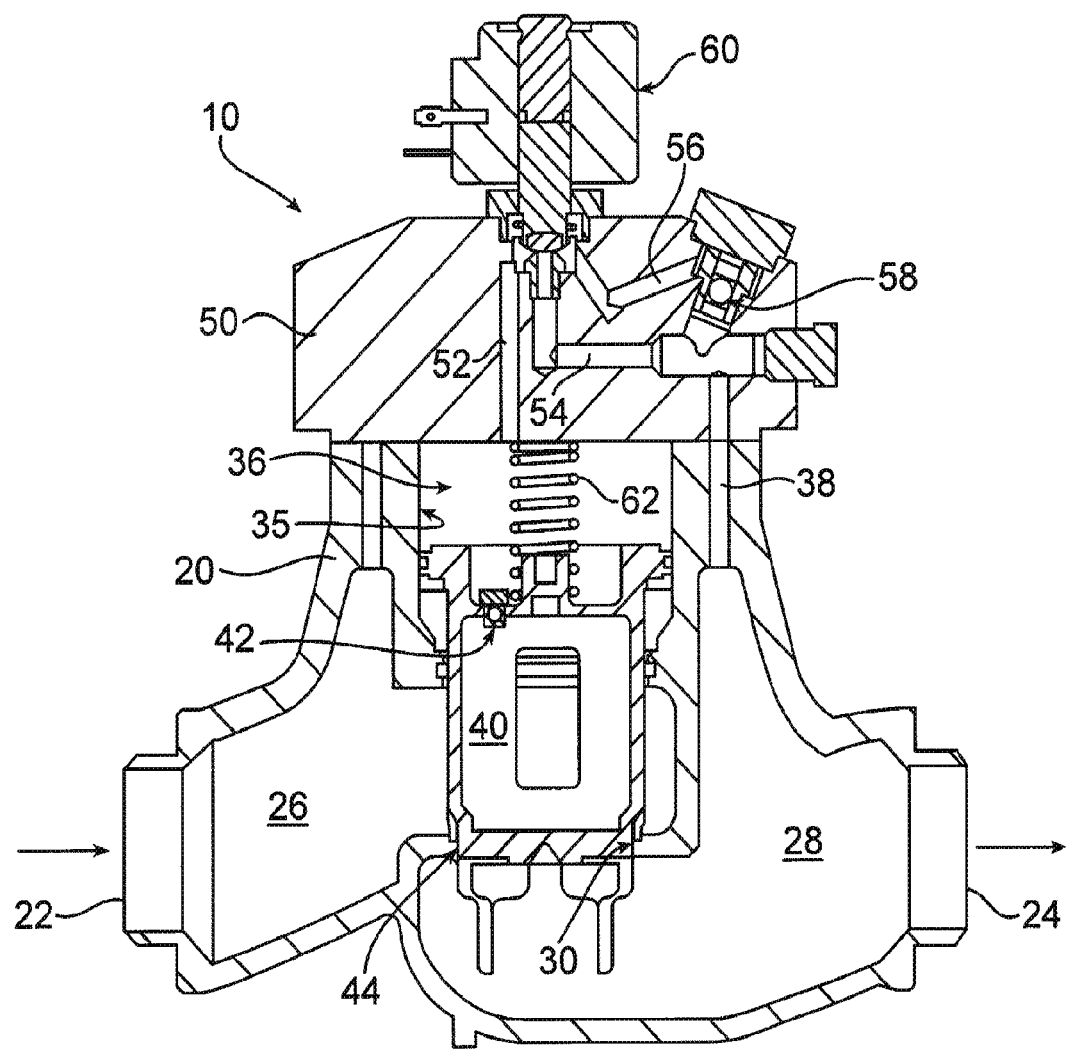
FIG. 3 is a cross-sectional view of an embodiment of the combination solenoid check valve in accordance with the present invention.

An embodiment of the present invention is shown in FIG. 3 as a combination solenoid check valve assembly 10. The valve assembly 10 comprises a valve body housing 20 having an inlet 22, an outlet 24, an inlet passageway 26, an outlet passageway 28 and a through port 30 (also referred to as the valve seat), providing a fluid passageway between the inlet passageway 26 and the outlet passageway 28. The valve assembly 10 also comprises a piston 40 reciprocable within a bore 35 in the valve body housing 20 which includes a valve member 44 being adapted to sealingly mate with the valve seat 30 to open and close the valve 10. The piston 40 is positioned such that the valve 10 opens by moving the valve member 44 of the piston 40 into the inlet passageway 26 and away from the outlet passageway 28 (similar to the prior art valve of FIG. 1 and opposite the prior art valve of FIG. 2). The piston 40 also includes a bleed hole check valve 42 which allows fluid to bleed from the inlet passageway 26 to the portion of the bore 35 above the piston 40 which is also referred to herein as the chamber 36 above the piston 40. An adapter plate 50 is attached to the open bore end of the housing 20. The adapter plate 50 has a first and second conduit connecting the chamber 36 in the housing 20 and the valve outlet passageway 28. The first conduit is formed by the combination of a first passageway 52 from chamber 36 above the piston 40 and a second passageway 54 which is fluidly connected to a passageway 38 in the housing 20 that leads to the outlet passageway 28. The first passageway 52 and the second passageway 54 are fluidly connected and disconnected by a solenoid valve 60. The second conduit is formed by the combination of the first passageway 52 and a third passageway 56 which is fluidly connected to the passageway 38 in the housing 20 that leads to the outlet passageway 28. The first passageway 52 and the third passageway 56 are fluidly connected regardless of whether the solenoid is on or off as these passageways effectively bypass the control of the solenoid valve 60. The second conduit includes a check valve 58 shown positioned at an end of the by-pass passageway 56 which allows fluid to flow from the outlet passageway 28 to the chamber 36 above the piston 40, but prevents fluid flow in the opposite direction.

The operation of the valve 10 is controlled by the solenoid valve 60. When the solenoid valve 60 is energized, fluid is allowed to flow from chamber 36 above the piston 40 to the outlet passageway 28 (low pressure) side of the valve 10. The pressure difference across the piston 40 (low on top/high internally) allows a spring 62 force to be overcome and the higher inlet pressure to push the piston 40 away from the seat 30 and open the valve 10. The valve 10 remains in the open position as long as the solenoid 60 is energized. Once the solenoid 60 is de-energized the pressure on top of the piston 40 in chamber 36 can no longer bleed to the outlet passageway 28 as the first conduit is blocked by the solenoid valve 60 and the second conduit is blocked by the check valve 58. The bleed hole check valve 42 in the piston 40 opens and allows the pressure on top of the piston 40 in chamber 36 to equalize with the pressure in the internal portions of the piston 40. Once the pressure has equalized, the main valve spring 62 can now push the piston 40 closed shutting off the valve port 30. Once again a pressure difference is created between the inlet passageway 26 and the outlet passageway 28, helping to hold it shut tightly. This operation of the valve is similar to the operation of the prior art valve 110 of FIG. 1.

In the prior art valve 110, if the outlet passageway 28' is at a pressure higher than the inlet passageway 26', the fluid pressure would simply lift the piston 40' away from the valve port 30'. In the valve 10 as shown in FIG. 3, the check valve 58 and the second conduit formed by the combination of the first passageway 52 and the third passageway 56 (which is fluidly connected to the passageway 38 in the housing 20 that leads to the outlet passageway 28) allow the valve 10 to automatically prevent fluid flow from the outlet passageway 28 to the inlet passageway 26. The check valve 58 is oriented to allow high pressure fluid from the outlet passageway 28 to enter the chamber 36 above the piston 40 which forces the piston 40 to move into a valve closed position against the valve seat 30. The high pressure in the chamber 36 above the piston 40 holds the piston 40 in a closed position. When the pressure in the chamber 36 is greater than the pressure in the inlet passageway 26, the bleed hole check valve 42 prevents fluid flow from the chamber 36 to the inlet passageway 26.

With the design of the valve 10, any high pressure build up on the outlet side of the valve 10 is utilized to hold the valve shut, versus letting it flow backwards through the valve 10. The concept is the same as that used to hold the valve shut during normal operation; utilize pressure to hold the valve shut. Being able to utilize the high pressure on the outlet side of the valve eliminates the need for a separate check valve.

The key to making this valve work is in two small pilot flow check valves 42, 58 inside the valve 10. These small pilot flow check valves comprise a metal orifice or seat, and a small PTFE ball. Pressure or flow either pushes the PTFE ball out of the way and allows passage of the fluid or gas, or pushes it back against the seat, closing the passage.

One of these passages (formed by the combination of first passageway 52, third passageway 56 and passageway 38) connects the chamber 36 on top of the piston 40 to the outlet passageway side 28 of the valve 10. During normal operation the higher pressure on top of the piston 40 pushes the PTFE ball of check valve 58 against the seat, closing this passage. This prevents the valve 10 from leaking when in the closed position. If an abnormal high pressure is experienced on the outlet side 28 of the valve 10, the same PTFE ball of check valve 58 is pushed off the seat allowing the pressure to be applied to the top of the piston 40, thus holding it shut. The other PTFE pilot flow check valve 42 is installed in the small bleed hole in the top of the piston 40. During normal operation this pilot flow check valve 42 allows passage from the internal portion of the piston 40 to the chamber 36 on top of the piston 40 to allow pressure equalization. When the valve experiences a high pressure on the outlet side and the first pilot flow check valve 58 opens, the check valve 42 in the top of the piston 40 closes to prevent leakage through to the inlet side 26 of the valve 10.

These two small pilot flow check valves 42, 58 working in conjunction allow the main solenoid valve's piston plug assembly to act as a check valve, stopping any flow backwards through the valve 10. The combination of the solenoid valve and the check valve into a single valve 10 can save in manufacturing costs, inventories, additional welds for two components, etc.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A one-way refrigeration valve assembly comprising:
    a valve body having spaced inlet and outlet passageways separated by an intermediate valve seat in open communication with the inlet and outlet passageways;
    a piston reciprocable within a bore in the valve body and forming a chamber with a portion of the bore above the piston, the piston including a valve member being adapted to sealingly mate with the valve seat;
    an adapter body secured to an open end of the bore in the valve body;
    a first conduit connecting the chamber above the piston to the outlet passageway,
    a solenoid assembly operable to open and close the first conduit;
    a second conduit connecting the chamber above the piston to the outlet passageway independently of the inlet passageway, the second conduit bypassing the solenoid assembly;
    a first check valve positioned in the second conduit and oriented to allow fluid flow from the outlet passageway to the chamber above the piston independently of the inlet passageway when pressure in the outlet passageway is greater than the pressure in the chamber above the piston, the first check valve preventing flow from the chamber above the piston to the outlet passageway when the pressure in the chamber above the piston is greater than the pressure in the outlet passageway; and
    a second check valve positioned through a portion of the piston and oriented to allow fluid flow from the inlet passageway to the chamber above the piston when pressure in the inlet passageway is greater than the pressure in the chamber above the piston, the second check valve preventing flow from the chamber above the piston to the inlet passageway when the pressure in the chamber above the piston is greater than the pressure at the inlet passageway,
    wherein when the solenoid assembly is open, flow from the chamber to the inlet passageway is precluded.

2. The valve assembly of claim 1, wherein the piston is positioned such that the valve opens by moving the valve member of the piston into the inlet passageway and away from the outlet passageway.

3. The valve assembly of claim 1, further comprising a biasing member for normally biasing the valve member toward the valve seat.

4. The valve assembly of claim 1, wherein a portion of the second conduit comprises a portion of the first conduit.

5. A one-way refrigeration valve assembly comprising:
    a valve body having spaced inlet and outlet passageways separated by an intermediate valve seat in open communication with the inlet and outlet passageways;
    a piston reciprocable within a bore in the valve body and forming a chamber with a portion of the bore above the piston, the piston including a valve member being adapted to sealingly mate with the valve seat;
    a first conduit connecting the chamber above the piston to the outlet passageway,
    a solenoid assembly operable to open and close the first conduit;
    a second conduit connecting the chamber above the piston to the outlet passageway independently of the inlet passageway, the second conduit bypassing the solenoid assembly, a portion of the second conduit comprises a portion of the first conduit;
    a first check valve positioned in the second conduit and oriented to allow fluid flow from the outlet passageway to the chamber above the piston independently of the inlet passageway when pressure in the outlet passageway is greater than the pressure in the chamber above the piston, the first check valve preventing flow from the chamber above the piston to the outlet passageway when the pressure in the chamber above the piston is greater than the pressure in the outlet passageway; and
    a second check valve positioned through a portion of the piston and oriented to allow fluid flow from the inlet passageway to the chamber above the piston when pressure in the inlet passageway is greater than the pressure in the chamber above the piston, the second check valve preventing flow from the chamber above the piston to the inlet passageway when the pressure in the chamber above the piston is greater than the pressure at the inlet passageway,
    wherein when the solenoid assembly is open, flow from the chamber to the inlet passageway is precluded.

6. The valve assembly of claim 5, wherein the piston is positioned such that the valve opens by moving the valve member of the piston into the inlet passageway and away from the outlet passageway.

7. The valve assembly of claim 5, further comprising a biasing member for normally biasing the valve member toward the valve seat.

8. The valve assembly of claim 5, further comprising an adapter body secured to an open end of the bore in the valve body.

* * * * *